United States Patent [19]
Dürr

[11] Patent Number: 5,490,428
[45] Date of Patent: Feb. 13, 1996

[54] METERING OF LIQUID SUBSTANCES

[75] Inventor: Dieter Dürr, Starnberg, Germany

[73] Assignee: Linde Aktiengesellschaft, Wiesbaden, Germany

[21] Appl. No.: 113,137

[22] Filed: Aug. 30, 1993

[30] Foreign Application Priority Data

Aug. 31, 1992 [DE] Germany .......................... 42 29 005.8

[51] Int. Cl.⁶ ........................... G01F 13/00; B65D 47/18
[52] U.S. Cl. ....................... 73/861.41; 222/420
[58] Field of Search ...................... 73/861.41; 222/420; 361/228; 347/1, 55, 75

[56] References Cited

U.S. PATENT DOCUMENTS

| | | | |
|---|---|---|---|
| 2,600,129 | 6/1952 | Richards | 361/228 |
| 3,476,291 | 11/1969 | Glaser | 222/420 X |
| 3,579,245 | 5/1971 | Berry | 347/75 |
| 3,934,192 | 1/1976 | de Latour | 222/420 X |

OTHER PUBLICATIONS

Chemische Technologie, vol. 7, Carl Hanswer Verlag München, pp. 82–95 and 131–132 (1975).

Primary Examiner—Kenneth A. Wieder
Assistant Examiner—William L. Oen
Attorney, Agent, or Firm—Millen, White, Zelane, & Branigan

[57] ABSTRACT

The process relates to the metering of liquid substances wherein the liquid substance, with separation of drops, is conducted through one or several discharge orifices, and the quantity of liquid is measured by way of the number of thus-produced drops. Liquid drops of varying sizes render exact metering impossible since no conclusion can be drawn to the exact quantity of liquid. According to the invention, drops of homogeneous density and constant size are produced by regulating the size of the drops by means of an electrical field generated in the zone of the discharge orifices.

9 Claims, 1 Drawing Sheet

5,490,428

METERING OF LIQUID SUBSTANCES

SUMMARY OF THE INVENTION

The invention relates to a process for metering liquid substances wherein the liquid substance is conducted, with separation of drops, through one or several discharge orifices, and the quantity of liquid is measured by way of the number of thus-produced drops.

Liquid metering methods of this type have been known, for example, from laboratories of medical, biological or chemical technological orientation. Liquids of a great variety of different types are added by means of pipettes or the like to a specific vehicle. In most cases, an exact metering of the added liquid substances is desirable. Also liquefied gases must frequently be added in exactly coordinated amounts, for example, to a gas or gas mixture.

Metering of the aforementioned liquid substances is problematic if minimum quantities of liquid are to be measured with low error tolerances. As low a fluctuation of the drop size as possible is needed in case the amount of liquid is measured based on the number of drops formed, or in case individual drops of a certain size are to be produced in reproducible fashion.

Therefore, it is an object of the present invention to develop a process making it possible to exactly meter a liquid substance by way of the number of liquid drops, wherein the liquid drops all are to exhibit a uniform density and size. In this process, the liquid substance is to be conducted, with separation of drops, through one or several discharge orifices, and the quantity of liquid is to be measured by way of the number of thus-produced drops.

Upon further study of the specification and appended claims, further objects and advantages of this invention will become apparent to those skilled in the art.

These objects are attained according to the invention by regulating the size of the drops by means of an electrical field generated in the zone of the discharge orifices.

Essentially, the diameter of a discharge orifice as well as the density and the surface tension of the liquid govern the size of liquid drops separating from this discharge orifice. The drop volume is here approximately proportional to the diameter of the discharge orifice and to the surface tension, and inversely proportional to the density of the liquid.

It has been found that the size of the liquid drops can be varied within a broad range by affecting the surface tension by means of an electrical field, if the orifice diameter and the liquid density remain constant.

According to the invention, for metering liquid substances, the liquid is conducted, with separation of drops, through one or several discharge orifices. An electrical field is produced in the zone of these orifices and the desired drop size is set by means of the electrical field strength. With the use of a suitable device for counting drops, the amount of liquid can then be measured by way of the number of drops.

Drop counting devices generally employ two different types of methods: imaging methods and methods using scattering of light. In imaging methods, pictures of the particles (drops) are produced which are (machine) analyzed. The pictures are taken with high frequency (short time photography; stroboscopic photography) or in the form of holograms. In light scattering methods, light or light pulses are scattered by the particles (drops) and the scattered light or the extincted light (in transmission) is detected. Physical theory shows that the intensity of the scattered or extincted light depends on the number of particles per volume. In practice, imaging methods are applied in cases where the particles have diameters of 100 μm and above. Naturally, in the case of low frequency of drops, drop counting "by hand" is possible.

Suitable drop counting devices are disclosed, for example, in Chemische Technologie, Vol. 7, Carl Hanser Verlag, München, pp. 88–89, Chapter 3.73 (1975).

A prior calibration can be effected, for example, by measuring, for a given liquid and a given diameter of the discharge orifice, the mass of the amount of liquid from a sufficient number of produced drops at a specific field strength. In this way, each field strength value can be associated with a specific mass of the produced drops.

By small variations of the electrical field strength, minor changes in the mass of the liquid drops can be obtained. In this way, the process according to this invention provides an extremely accurate metering of liquid substances.

Preferably, an electrical field is generated in the zone of the discharge orifices by connecting discharge orifices consisting of an electrically conductive material to an electrical voltage pole. The opposite pole is connected to an electrode located at a specific spacing with respect to the discharge orifices. In case of small distances between counter electrode and discharge orifices, the counter electrode is advantageously equipped with interstices so that the thus-separated drops can fall through these interstices unimpeded.

Suitable electrically conductive materials are aluminum, copper, iron, steel, brass and other alloys. Preferably, copper is used as the material for the discharge electrode and brass for the counterelectrode.

The liquid is forced through the orifices under its own hydrostatic pressure or with the aid of a constant pressure force supplied externally. By increasing the voltage applied to the discharge orifices and to the counter electrode, the surface tension of the liquid drops and thus also the drop size can be precisely controlled within a large range. By virtue of this process according to the invention, drops can be produced having a size of below 1 mm up to several mm in diameter.

If no voltage is applied, the size of the drops is unchanged. However, when an alteration in drop size is desired, the voltage applied is preferably >0–about 30 kV per centimeter of spacing between the electrodes, 30 kV/cm being the breakdown voltage for air. Thus, for a spacing of 1 cm, the maximum voltage is preferably about 30 kV. The preferred voltage range is >0–10 kV per centimeter.

The spacing between the discharge orifice and the counterelectrode is preferably about 0.2–4 cm, especially 0.5–2 cm.

For example, using a discharge orifice of 0.2 mm, the drop size for water when no voltage is applied is 2.8 mm in diameter. If a voltage of 7 kV is applied with an electrode spacing of 1.2 cm, the drop size for water is 0.3 mm in diameter.

The process of this invention for metering liquid substances can be utilized most efficiently in case of polar fluids because here the surface tension can be maximally influenced. Water and aqueous solutions, in particular, represent suitable materials.

For metering of liquids in accordance with this invention, a device which is advantageously utilized comprises one or several electrically conductive discharge orifices for a liquid substance, these orifices being connected to one pole of a voltage source, wherein an electrode is arranged in opposition to this discharge orifice or these discharge orifices; this electrode is connected to the second pole of the voltage source and exhibits interstices for the unimpeded passage of the liquid substance.

One embodiment of the process according to this invention will be described in greater detail below.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 1:
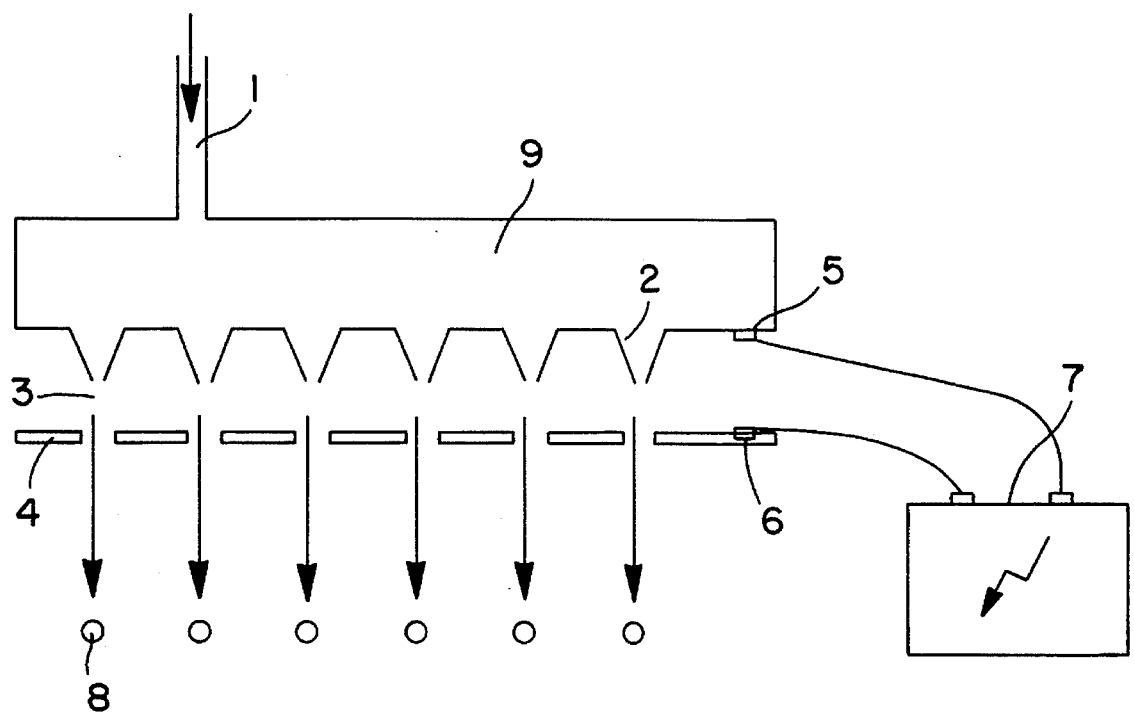
FIG. 1 shows schematically a facility for metering liquid substances in accordance with the disclosed process.

An exactly metered quantity of a chemical substance in aqueous solution is to be dispensed into a series of containers arranged side-by-side. For this purpose, the facility can be utilized according to this invention as illustrated schematically in the drawing.

The discharge orifices 3 for the liquid substance are designed in this case in the manner of nozzles 2 with a diameter of about 1.5 mm and are made of an electrically conductive material.

Suitable designs for the discharge orifices include cylindrical small tubes (e,g., copper tubes with an external diameter of 0.6 mm, an internal diameter of 0.2 mm, and a length of 0.6 mm long), tubes with cone-shaped orifices, or hollow needles.

The upper internal chamber 9 of the facility is supplied with the respective solution by way of conduit 1. Since the liquid is conducted through the discharge orifices 3 under its own hydrostatic pressure, a constant filling level must be observed in the internal chamber 9. As the electrode 4, a metallic grid is located in opposition to the discharge orifices 3; the interstices of this grid lie below the discharge direction, marked by arrows, of the liquid drops separating from the discharge orifices 3 so that these drops can fall unhindered into the bottom containers, not illustrated.

The nozzles 2 with the discharge orifices 3 are electrically connected with one another and are connected 5 to the one pole of a high-voltage source 7, the second pole of which is electrically connected 6 to the electrode 4. This arrangement can generate a strong electrical field in the zone of the discharge orifices 3.

The drop size is regulated according to the invention by the high voltage applied to the discharge orifices 3 and the electrode 4. This voltage can be set to be closely below the breakdown voltage. Without voltage application, drop sizes of a diameter of about 4 mm are obtained for aqueous solutions; with increasing voltage up to about 10 kV per cm of spacing of discharge orifice 3 to electrode 4, the drop size can be reduced to below 1 mm in diameter.

After an appropriate calibration, each voltage value at the high-voltage source 7 can be associated with a specific size and mass of the liquid drops 8.

Depending on the desired amount of liquid, a specific number of drops is passed into the containers located below the discharge orifices 3.

Between two electrodes spaced with a diameter d, a spark discharge occurs at a voltage proportional to the distance d. The breakdown field intensity therefore depends on the material in which the electrodes are arranged. For air, it is about 30 kV/cm (under normal conditions, in a homogenous field). For better insulators, it is about 500 kV/cm.

The process according to this invention can be utilized on an industrial scale, is economical, and is more time-saving as well as more reliable than other conventional metering processes.

Without further elaboration, it is believed that one skilled in the art can, using the preceding description, utilize the present invention to its fullest extent. The preferred specific embodiments are, therefore, to be construed as merely illustrative, and not limitative of the remainder of the disclosure in any way whatsoever.

In the foregoing, all temperatures are set forth uncorrected in degrees Celsius and unless otherwise indicated, all parts and percentages are by weight.

The entire disclosure of all applications, patents and publications, cited above, and of corresponding German application P 42 29 005.8, filed Aug. 31, 1992, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for metering a liquid substance comprising:

forcing a liquid substance, with separation into drops, through at least one discharge orifice made of electrically conductive material by application of a constant externally supplied pressure force;

generating an electrical field in the zone of said at least one discharge orifice by applying electrical voltage to the at least one discharge orifice and to a counterelectrode spaced therefrom whereby said drops are subjected to said electrical field; and measuring the amount of liquid dispensed by counting the number of drops, wherein the size of each of said drops is regulated by the amount of voltage applied to generate said electrical field in the zone of said at least one discharge orifice.

2. A process according to claim 1, wherein the size of the drops produced by said electrical field are less than 1 mm in diameter.

3. A process according to claim 1, wherein said at least one discharge orifice is connected to a pole of a voltage source and an electrode is arranged in opposition to said at least one discharge orifice, said electrode being connected to the other pole of said voltage source and said electric field being generated by application of a voltage between said at least one discharge orifice and said electrode.

4. A process according to claim 3, wherein the applied voltage is up to 10 kV per cm of spacing between said at least one discharge orifice and said electrode.

5. A process according to claim 1, further comprising adjusting the size of said drops by adjusting the amount of voltage applied to generate said electric field.

6. A process according to claim 1, where the size of the drops is less than 1 mm.

7. A process according to claim 1, wherein said liquid substance is forced through said at least one discharge nozzle.

8. A process for regulating the droplet size of a dispensed liquid, said process comprising:

dispensing drops of liquid through at least one discharge nozzle made of electrically conductive material by application of a constant externally supplied pressure force; and generating an electric field between said at least one discharge nozzle and an electrode spaced therefrom, whereby the strength of said electric field regulates the size of each of the dispensed drops of liquid.

9. A process for metering a liquid substance comprising:

forcing a liquid substance, with separation into drops, through at least one discharge orifice by application of hydrostatic pressure wherein the amount of hydrostatic pressure applied is sufficient by itself to force said liquid substance through said at least one discharge orifice;

generating an electrical field in the zone of said at least one discharge orifice made of electrically conductive material by applying electrical voltage to the at least one discharge orifice and to a counterelectrode spaced therefrom whereby said drops are subjected to said electrical field; and measuring the amount of liquid dispensed by counting the number of drops, wherein the size of each of said drops is regulated by the amount of voltage applied to generate said electrical field in the zone of said at least one discharge orifice.

* * * * *